US008645971B2

(12) United States Patent
Carlson et al.

(10) Patent No.: US 8,645,971 B2
(45) Date of Patent: Feb. 4, 2014

(54) REAL-TIME BALANCE UPDATES

(75) Inventors: Mark Carlson, Half Moon Bay, CA (US); Ayman Hammad, Pleasanton, CA (US); Patrick Faith, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 812 days.

(21) Appl. No.: 11/963,736

(22) Filed: Dec. 21, 2007

(65) Prior Publication Data

US 2008/0163257 A1 Jul. 3, 2008

Related U.S. Application Data

(60) Provisional application No. 60/871,898, filed on Dec. 26, 2006.

(51) Int. Cl.
*G06F 3/00* (2006.01)
*G06Q 20/00* (2012.01)

(52) U.S. Cl.
USPC .............................. 719/318; 719/313; 705/17

(58) Field of Classification Search
None
See application file for complete search history.

(56) References Cited

U.S. PATENT DOCUMENTS

| | | | |
|---|---|---|---|
| 3,356,021 A | 12/1967 | May et al. | |
| 4,044,231 A | 8/1977 | Beck et al. | |
| 4,613,904 A | 9/1986 | Lurie | |
| 4,614,861 A | 9/1986 | Pavlov et al. | |
| 4,674,041 A | 6/1987 | Lemon et al. | |
| 4,701,601 A | 10/1987 | Francini et al. | |
| 4,868,376 A | 9/1989 | Lessin et al. | |
| 5,034,597 A | 7/1991 | Atsumi et al. | |
| 5,305,196 A | 4/1994 | Deaton et al. | |
| 5,327,508 A | 7/1994 | Deaton et al. | |
| 5,353,218 A | 10/1994 | DeLapa et al. | |
| 5,359,183 A | 10/1994 | Skodlar | |
| 5,388,165 A | 2/1995 | Deaton et al. | |
| RE34,915 E | 4/1995 | Nichtberger et al. | |
| 5,420,606 A | 5/1995 | Begum et al. | |
| 5,430,644 A | 7/1995 | Deaton et al. | |
| 5,448,471 A | 9/1995 | Deaton et al. | |
| 5,465,206 A | 11/1995 | Hilt et al. | |
| 5,477,038 A | 12/1995 | Levine et al. | |

(Continued)

FOREIGN PATENT DOCUMENTS

CN 1652130 A 8/2005
EP 1 096 439 A2 5/2001

(Continued)

OTHER PUBLICATIONS

"Pervasive Computing Goes the Last Hundred Feet with RFID Systems", Vince Stanford, 2003, pp. 1-6.*

(Continued)

*Primary Examiner* — Tuan Dao
(74) *Attorney, Agent, or Firm* — Kilpatrick Townsend & Stockton LLP

(57) ABSTRACT

A method and a system that retrieves dynamic data when a notification with dynamic data is triggered. The dynamic data is associated with an account that is associated with a portable consumer device associated with a consumer. The method and system automatically send the notification with the dynamic data to a notification device, wherein the notification with the dynamic data is provided to the consumer.

23 Claims, 3 Drawing Sheets

(56) References Cited

U.S. PATENT DOCUMENTS

| | | |
|---|---|---|
| 5,483,444 A | 1/1996 | Heintzeman et al. |
| 5,500,513 A | 3/1996 | Langhans et al. |
| 5,502,636 A | 3/1996 | Clarke |
| 5,530,438 A | 6/1996 | Bickham et al. |
| 5,564,073 A | 10/1996 | Takahisa |
| 5,577,266 A | 11/1996 | Takahisa et al. |
| 5,579,537 A | 11/1996 | Takahisa |
| 5,592,560 A | 1/1997 | Deaton et al. |
| 5,604,921 A | 2/1997 | Alanara |
| 5,615,110 A | 3/1997 | Wong |
| 5,621,201 A | 4/1997 | Langhans et al. |
| 5,621,812 A | 4/1997 | Deaton et al. |
| 5,627,549 A | 5/1997 | Park |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,165 A | 8/1997 | Jennings et al. |
| 5,659,469 A | 8/1997 | Deaton et al. |
| 5,675,662 A | 10/1997 | Deaton et al. |
| 5,678,939 A | 10/1997 | Ross |
| 5,687,322 A | 11/1997 | Deaton et al. |
| 5,708,422 A | 1/1998 | Blonder et al. |
| 5,710,886 A | 1/1998 | Christensen et al. |
| 5,717,866 A | 2/1998 | Naftzger |
| 5,761,648 A | 6/1998 | Golden et al. |
| 5,777,903 A | 7/1998 | Piosenka et al. |
| 5,791,991 A | 8/1998 | Small |
| 5,793,972 A | 8/1998 | Shane |
| 5,806,044 A | 9/1998 | Powell |
| 5,822,735 A | 10/1998 | De Lapa et al. |
| 5,855,007 A | 12/1998 | Jovicic et al. |
| 5,870,030 A | 2/1999 | DeLuca et al. |
| 5,884,277 A | 3/1999 | Khosla |
| 5,905,246 A | 5/1999 | Fajkowski |
| 5,907,830 A | 5/1999 | Engel et al. |
| 5,924,080 A | 7/1999 | Johnson |
| 5,959,577 A | 9/1999 | Fan et al. |
| 5,974,399 A | 10/1999 | Giuliani et al. |
| 5,991,749 A | 11/1999 | Morrill, Jr. |
| 6,002,771 A | 12/1999 | Nielsen |
| 6,009,411 A | 12/1999 | Kepecs |
| 6,009,415 A | 12/1999 | Shurling et al. |
| 6,012,038 A | 1/2000 | Powell |
| 6,014,634 A | 1/2000 | Scroggie et al. |
| 6,018,718 A | 1/2000 | Walker et al. |
| 6,029,151 A | 2/2000 | Nikander |
| 6,035,280 A | 3/2000 | Christensen |
| 6,041,309 A | 3/2000 | Laor |
| 6,049,778 A | 4/2000 | Walker et al. |
| 6,055,505 A | 4/2000 | Elston |
| 6,062,991 A | 5/2000 | Moriarty et al. |
| 6,064,990 A | 5/2000 | Goldsmith |
| 6,067,526 A | 5/2000 | Powell |
| 6,067,529 A | 5/2000 | Ray et al. |
| 6,076,068 A | 6/2000 | DeLapa et al. |
| 6,076,069 A | 6/2000 | Laor |
| 6,076,101 A | 6/2000 | Kamakura et al. |
| 6,128,599 A | 10/2000 | Walker et al. |
| 6,185,290 B1 | 2/2001 | Shaffer et al. |
| 6,185,541 B1 | 2/2001 | Scroggie et al. |
| 6,227,447 B1 | 5/2001 | Campisano |
| 6,237,145 B1 | 5/2001 | Narasimhan et al. |
| 6,247,129 B1 | 6/2001 | Keathley et al. |
| 6,267,292 B1 | 7/2001 | Walker et al. |
| 6,279,112 B1 | 8/2001 | O'Toole, Jr. et al. |
| 6,292,786 B1 | 9/2001 | Deaton et al. |
| 6,307,958 B1 | 10/2001 | Deaton et al. |
| 6,318,631 B1 | 11/2001 | Halperin |
| 6,321,208 B1 | 11/2001 | Barnett et al. |
| 6,330,543 B1 | 12/2001 | Kepecs |
| 6,330,550 B1 | 12/2001 | Brisebois et al. |
| 6,334,108 B1 | 12/2001 | Deaton et al. |
| 6,336,098 B1 | 1/2002 | Fortenberry et al. |
| 6,336,099 B1 | 1/2002 | Barnett et al. |
| 6,341,724 B2 | 1/2002 | Campisano |
| 6,351,735 B1 | 2/2002 | Deaton et al. |
| 6,377,935 B1 | 4/2002 | Deaton et al. |
| 6,378,775 B2 | 4/2002 | Hayashida |
| 6,381,324 B1 | 4/2002 | Shaffer et al. |
| 6,424,949 B1 | 7/2002 | Deaton et al. |
| 6,424,951 B1 | 7/2002 | Shurling et al. |
| 6,434,534 B1 | 8/2002 | Walker et al. |
| 6,470,181 B1 | 10/2002 | Maxwell |
| 6,484,146 B2 | 11/2002 | Day et al. |
| 6,488,203 B1 | 12/2002 | Stoutenburg et al. |
| 6,505,046 B1 | 1/2003 | Baker |
| 6,516,302 B1 | 2/2003 | Deaton et al. |
| 6,529,725 B1 | 3/2003 | Joao et al. |
| 6,535,855 B1 | 3/2003 | Cahill et al. |
| 6,560,581 B1 | 5/2003 | Fox et al. |
| 6,584,309 B1 | 6/2003 | Whigham |
| 6,587,835 B1 | 7/2003 | Treyz et al. |
| 6,594,376 B2 | 7/2003 | Hoffman et al. |
| 6,601,759 B2 | 8/2003 | Fife et al. |
| 6,609,104 B1 | 8/2003 | Deaton et al. |
| 6,611,811 B1 | 8/2003 | Deaton et al. |
| 6,631,849 B2 | 10/2003 | Blossom |
| 6,647,257 B2 | 11/2003 | Owensby |
| 6,647,269 B2 | 11/2003 | Hendrey et al. |
| 6,664,948 B2 | 12/2003 | Crane et al. |
| 6,684,195 B1 | 1/2004 | Deaton et al. |
| 6,685,093 B2 | 2/2004 | Challa et al. |
| 6,736,322 B2 | 5/2004 | Gobburu et al. |
| 6,747,547 B2 | 6/2004 | Benson |
| 6,749,118 B2 | 6/2004 | Kobayashi et al. |
| 6,775,539 B2 | 8/2004 | Deshpande |
| 6,832,721 B2 | 12/2004 | Fujii |
| 6,837,425 B2 | 1/2005 | Gauthier et al. |
| 6,868,391 B1 | 3/2005 | Hultgren |
| 6,877,665 B2 | 4/2005 | Challa et al. |
| 6,892,941 B2 | 5/2005 | Rosenblum |
| 6,912,398 B1 | 6/2005 | Domnitz |
| 6,920,611 B1 | 7/2005 | Spaeth et al. |
| 6,975,852 B1 | 12/2005 | Sofer et al. |
| 6,990,330 B2 | 1/2006 | Voerepalli et al. |
| 7,003,497 B2 | 2/2006 | Maes |
| 7,007,840 B2 | 3/2006 | Davis |
| 7,013,286 B1 | 3/2006 | Aggarwal et al. |
| 7,025,256 B1 | 4/2006 | Drummond et al. |
| 7,028,906 B2 | 4/2006 | Challa et al. |
| 7,039,611 B2 | 5/2006 | Devine |
| 7,040,533 B1 | 5/2006 | Ramachandran |
| 7,051,923 B2 | 5/2006 | Nguyen et al. |
| 7,055,031 B2 | 5/2006 | Platt |
| 7,076,329 B1 | 7/2006 | Kolls |
| 7,089,208 B1 | 8/2006 | Levchin et al. |
| 7,099,850 B1 | 8/2006 | Mann et al. |
| 7,104,446 B2 | 9/2006 | Bortolin et al. |
| 7,107,250 B2 | 9/2006 | Harrison |
| 7,110,954 B2 | 9/2006 | Yung et al. |
| 7,121,456 B2 | 10/2006 | Spaeth et al. |
| 7,124,937 B2 | 10/2006 | Myers et al. |
| 7,150,393 B1 | 12/2006 | Drummond et al. |
| 7,152,780 B2 | 12/2006 | Gauthier et al. |
| 7,159,770 B2 | 1/2007 | Onozu et al. |
| 7,194,437 B1 | 3/2007 | Britto et al. |
| 7,201,313 B1 | 4/2007 | Ramachandran |
| 7,203,300 B2 | 4/2007 | Shaffer et al. |
| 7,207,477 B1 | 4/2007 | Ramachandran |
| 7,213,755 B2 | 5/2007 | Newsome et al. |
| 7,231,357 B1 | 6/2007 | Shanman et al. |
| 7,231,372 B1 | 6/2007 | Prange et al. |
| RE39,736 E | 7/2007 | Morrill, Jr. |
| 7,243,853 B1 | 7/2007 | Levy et al. |
| 7,257,545 B1 | 8/2007 | Hung |
| 7,280,981 B2 | 10/2007 | Huang et al. |
| 7,290,704 B1 | 11/2007 | Ball et al. |
| 7,308,254 B1 | 12/2007 | Rissanen |
| 7,343,149 B2 | 3/2008 | Benco et al. |
| 7,350,702 B2 | 4/2008 | Bortolin et al. |
| 7,353,187 B1 | 4/2008 | Emodi et al. |
| 7,356,516 B2 | 4/2008 | Richey et al. |
| 7,357,310 B2 | 4/2008 | Calabrese et al. |

(56) References Cited

U.S. PATENT DOCUMENTS

| | | |
|---|---|---|
| 7,407,094 B2 | 8/2008 | Myers et al. |
| 7,440,771 B2 | 10/2008 | Purk |
| 7,447,662 B2 | 11/2008 | Gibson |
| 7,464,867 B1 | 12/2008 | Kolls |
| 7,653,599 B2 | 1/2010 | Doran et al. |
| 7,711,783 B1 * | 5/2010 | Violleau et al. ............... 709/206 |
| 8,127,999 B2 | 3/2012 | Diamond |
| 2001/0013542 A1 | 8/2001 | Horowitz et al. |
| 2002/0013711 A1 | 1/2002 | Ahuja et al. |
| 2002/0062249 A1 | 5/2002 | Iannacci et al. |
| 2002/0065713 A1 | 5/2002 | Awada et al. |
| 2002/0091569 A1 | 7/2002 | Kitaura et al. |
| 2002/0128903 A1 | 9/2002 | Kernahan |
| 2002/0161701 A1 | 10/2002 | Warmack |
| 2002/0165775 A1 | 11/2002 | Tagseth et al. |
| 2002/0169719 A1 | 11/2002 | Dively et al. |
| 2002/0190118 A1 | 12/2002 | Davenport et al. |
| 2002/0198777 A1 | 12/2002 | Yuasa |
| 2003/0004808 A1 | 1/2003 | Elhaoussine |
| 2003/0058261 A1 | 3/2003 | Challa et al. |
| 2003/0120593 A1 | 6/2003 | Bansal et al. |
| 2003/0126078 A1 | 7/2003 | Vihinen |
| 2003/0144907 A1 | 7/2003 | Cohen et al. |
| 2003/0172040 A1 | 9/2003 | Kemper et al. |
| 2003/0208406 A1 | 11/2003 | Okamoto et al. |
| 2003/0212595 A1 | 11/2003 | Antonucci |
| 2003/0212642 A1 | 11/2003 | Weller et al. |
| 2003/0225618 A1 | 12/2003 | Hessburg et al. |
| 2003/0230630 A1 | 12/2003 | Whipple et al. |
| 2003/0233292 A1 | 12/2003 | Richey et al. |
| 2004/0019522 A1 | 1/2004 | Bortolin et al. |
| 2004/0030601 A1 * | 2/2004 | Pond et al. ............... 705/16 |
| 2004/0044621 A1 | 3/2004 | Huang et al. |
| 2004/0049455 A1 | 3/2004 | Mohsenzadeh |
| 2004/0050922 A1 | 3/2004 | Gauthier et al. |
| 2004/0054575 A1 | 3/2004 | Marshall |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0064406 A1 | 4/2004 | Yates et al. |
| 2004/0117254 A1 | 6/2004 | Nemirofsky et al. |
| 2004/0133653 A1 | 7/2004 | Defosse et al. |
| 2004/0139021 A1 | 7/2004 | Reed et al. |
| 2004/0148224 A1 | 7/2004 | Gauthier et al. |
| 2004/0153715 A1 | 8/2004 | Spaeth et al. |
| 2004/0158534 A1 | 8/2004 | Azami et al. |
| 2004/0186770 A1 * | 9/2004 | Pettit et al. ............... 705/14 |
| 2004/0199470 A1 | 10/2004 | Ferry, Jr. et al. |
| 2004/0220964 A1 | 11/2004 | Shiftan et al. |
| 2004/0243519 A1 | 12/2004 | Perttila et al. |
| 2004/0254848 A1 | 12/2004 | Golan et al. |
| 2004/0260653 A1 | 12/2004 | Tsuei et al. |
| 2005/0021456 A1 | 1/2005 | Steele et al. |
| 2005/0029344 A1 | 2/2005 | Davis |
| 2005/0035847 A1 | 2/2005 | Bonalle et al. |
| 2005/0036611 A1 | 2/2005 | Seaton, Jr. et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0075958 A1 | 4/2005 | Gonzalez |
| 2005/0097473 A1 | 5/2005 | Malik et al. |
| 2005/0102233 A1 | 5/2005 | Park et al. |
| 2005/0102234 A1 | 5/2005 | Devine |
| 2005/0121506 A1 | 6/2005 | Gauthier et al. |
| 2005/0149455 A1 | 7/2005 | Bruesewitz et al. |
| 2005/0177510 A1 | 8/2005 | Hilt et al. |
| 2005/0199714 A1 | 9/2005 | Brandt et al. |
| 2005/0210387 A1 | 9/2005 | Alagappan et al. |
| 2005/0219061 A1 | 10/2005 | Lai et al. |
| 2005/0222933 A1 | 10/2005 | Wesby |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0053056 A1 | 3/2006 | Alspach-Goss et al. |
| 2006/0059110 A1 | 3/2006 | Madhok et al. |
| 2006/0079282 A1 | 4/2006 | Niimi |
| 2006/0080243 A1 | 4/2006 | Kemper et al. |
| 2006/0085260 A1 | 4/2006 | Yamagishi |
| 2006/0111967 A1 | 5/2006 | Forbes |
| 2006/0122881 A1 | 6/2006 | Walker et al. |
| 2006/0155644 A1 | 7/2006 | Reid et al. |
| 2006/0163345 A1 | 7/2006 | Myers et al. |
| 2006/0178957 A1 | 8/2006 | LeClaire |
| 2006/0179007 A1 | 8/2006 | Davis |
| 2006/0202025 A1 | 9/2006 | Calabrese et al. |
| 2006/0206376 A1 | 9/2006 | Gibbs et al. |
| 2006/0218086 A1 | 9/2006 | Campbell et al. |
| 2006/0224449 A1 | 10/2006 | Byerley et al. |
| 2006/0247981 A1 * | 11/2006 | Singh et al. ............... 705/26 |
| 2006/0248007 A1 | 11/2006 | Hofer et al. |
| 2006/0253390 A1 | 11/2006 | McCarthy et al. |
| 2006/0270421 A1 | 11/2006 | Phillips et al. |
| 2006/0282382 A1 | 12/2006 | Balasubramamian et al. |
| 2006/0290501 A1 | 12/2006 | Hammad et al. |
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005613 A1 | 1/2007 | Singh et al. |
| 2007/0005774 A1 | 1/2007 | Singh et al. |
| 2007/0012764 A1 | 1/2007 | Bortolin et al. |
| 2007/0017970 A1 | 1/2007 | Gauthier et al. |
| 2007/0027803 A1 | 2/2007 | Brandes et al. |
| 2007/0034679 A1 | 2/2007 | Gauthier et al. |
| 2007/0055597 A1 | 3/2007 | Patel et al. |
| 2007/0055630 A1 | 3/2007 | Gauthier et al. |
| 2007/0057034 A1 | 3/2007 | Gauthier et al. |
| 2007/0057051 A1 | 3/2007 | Bortolin et al. |
| 2007/0083465 A1 | 4/2007 | Ciurea et al. |
| 2007/0100691 A1 | 5/2007 | Patterson |
| 2007/0125842 A1 | 6/2007 | Antoo et al. |
| 2007/0194104 A1 | 8/2007 | Fukuda |
| 2007/0203836 A1 | 8/2007 | Dodin |
| 2007/0205270 A1 | 9/2007 | Kemper et al. |
| 2007/0241189 A1 | 10/2007 | Slavin et al. |
| 2007/0244811 A1 | 10/2007 | Tumminaro |
| 2007/0250380 A1 | 10/2007 | Mankoff |
| 2007/0276764 A1 | 11/2007 | Mann |
| 2007/0288373 A1 | 12/2007 | Wilkes |
| 2008/0003987 A1 | 1/2008 | Mechaley |
| 2008/0006685 A1 | 1/2008 | Rackley |
| 2008/0021784 A1 | 1/2008 | Hessburg et al. |
| 2008/0040265 A1 | 2/2008 | Rackley, III et al. |
| 2008/0041937 A1 * | 2/2008 | Vawter ............... 235/380 |
| 2008/0114657 A1 | 5/2008 | Forzley |
| 2008/0120182 A1 | 5/2008 | Arnold et al. |
| 2008/0126145 A1 * | 5/2008 | Rackley, III et al. ............ 705/7 |
| 2008/0133366 A1 | 6/2008 | Evans et al. |
| 2008/0154727 A1 | 6/2008 | Carlson |
| 2008/0154735 A1 | 6/2008 | Carlson |
| 2008/0154772 A1 | 6/2008 | Carlson |
| 2008/0167991 A1 | 7/2008 | Carlson et al. |
| 2008/0183480 A1 | 7/2008 | Carlson |
| 2008/0201226 A1 | 8/2008 | Carlson |
| 2008/0208762 A1 | 8/2008 | Arthur et al. |
| 2008/0300973 A1 | 12/2008 | DeWitt et al. |
| 2008/0319843 A1 | 12/2008 | Moser et al. |
| 2009/0076896 A1 | 3/2009 | DeWitt et al. |
| 2009/0076925 A1 | 3/2009 | DeWitt et al. |
| 2009/0078777 A1 | 3/2009 | Granucci et al. |
| 2009/0081990 A1 | 3/2009 | Granucci et al. |
| 2009/0094126 A1 * | 4/2009 | Killian et al. ............... 705/17 |
| 2009/0112721 A1 | 4/2009 | Hammad et al. |
| 2009/0119170 A1 | 5/2009 | Hammad et al. |
| 2009/0182634 A1 | 7/2009 | Park et al. |
| 2009/0314840 A1 | 12/2009 | Granucci et al. |

(56) References Cited

U.S. PATENT DOCUMENTS

| | | |
|---|---|---|
| 2009/0327134 A1 | 12/2009 | Carlson et al. |
| 2009/0327151 A1 | 12/2009 | Carlson et al. |
| 2010/0017275 A1 | 1/2010 | Carlson et al. |

FOREIGN PATENT DOCUMENTS

| | | |
|---|---|---|
| EP | 1 136 961 A1 | 9/2001 |
| EP | 1 517 255 A1 | 3/2005 |
| GB | 2 348 781 B | 11/2003 |
| JP | 10-116306 A | 5/1998 |
| JP | 2010116306 A | 5/1998 |
| JP | 2000222498 A | 8/2000 |
| JP | 2002183569 A | 6/2002 |
| JP | 200322255 A | 1/2003 |
| JP | 2003108777 A | 4/2003 |
| JP | 2005122505 A | 5/2005 |
| JP | 2006519448 A | 8/2006 |
| WO | WO 96/13814 A1 | 5/1996 |
| WO | WO 97/45814 A1 | 12/1997 |
| WO | WO 99/51038 | 7/1999 |
| WO | WO 00/03328 | 1/2000 |
| WO | WO 00/77697 A1 | 12/2000 |
| WO | WO 2004/077369 A1 | 9/2004 |
| WO | WO 2005/052869 A1 | 6/2005 |
| WO | WO 2006/024080 A1 | 3/2006 |

OTHER PUBLICATIONS

"Virtual Shopping: Straight Goods on Cyber-stores and Security." *Chatelaine*; vol. 70, p. 24 (Feb. 1997).
About Us, 1 page downloaded from http://www.cellfire.com/about-us/ on May 10, 2007, 1 page.
bCode™ is the future of Mobile Coupon, Ticketing, Loyalty and Payments, 2 page product brochure downloaded from http://www.bcode.com on May 11, 2007, 2 pages.
bCode™ MediaHub 200 Mobile Coupon, Ticketing Loyalty and Payments, 2 page product brochure, from http://www.bcode.com/news_media.htm on May 11, 2007, 2 pages.
Cellfire—Mobile coupons for your cell phone, 1 page product brochure downloaded from http://www.cellfire.com on May 11, 2007, 1 page.
Cellfire, Coupons on Cellfire, 2 pages downloaded from http://www.cellfire.com/coupons on May 10, 2007, 2 pages.
International Preliminary Report on Patentability from International Application No. PCT/US2007/088289 dated Jun. 30, 2009.
International Preliminary Report on Patentability from International Application No. PCT/US2007/088313 dated Jun. 30, 2009.
International Preliminary Report on Patentability from International Application No. PCT/US2007/088563 dated Jun. 30, 2009.
International Preliminary Report on Patentability from International Application No. PCT/US2007/088659 dated Jun. 30, 2009.
International Preliminary Report on Patentability from International Application No. PCT/US2007/088687 dated Jun. 30, 2009.
International Search Report from International Application No. PCT/US2008/076761 dated Dec. 16, 2008.
International Search Report from International Application No. PCT/US2008/077688 dated Dec. 2, 2008.
Press Release, "Three months after California release, Cellfire™ reports redemption rates n times greater than paper coupons," issued by Cellfire, Inc. Mar. 22, 2006; pp. 1-2 downloaded from http://www.cellfire.com/about-us/articles/2006-03-22_redemption-rate, 2 pages.
Purdy et al., "When Mobile Coupons Replace Paper Coupons, Everyone Wins," pp. 1-17 published by Frost & Sullivan.[online]. info.cellfire.com, May 11, 2007, [Retrieved from the Internet: URL: http://info.cellfire.com/cellfire/themes/cellfire/downloads/When_Mobile_Coupons_Replace_Paper_Coupons.pdf], 17 pages.

"Adding value to SmarTrip is as easy as using it", 1998-2004, WMATA, http://www.wmata.com/riding/smartrip_adding_value.cfm (1 page).
"SmarTrip More Than a Smart Card. It's Pure Genius", 1998-2004, WMATA, http://www.wmata.com/riding/smartrip.cfm (2 pages).
International Preliminary Report on Patentability and Written Opinion from International Application No. PCT/US2007/088615, dated Jun. 10, 2008.
International Preliminary Report on Patentability from PCT/US2007/088563, dated Jul. 9, 2009.
International Search Report and Written Opinion from International Application No. PCT/US2007/088313, dated Jun. 30, 2008.
International Search Report and Written Opinion from PCT/US2007/088289, dated May 15, 2008.
International Search Report from International Application No. PCT/US2007/088615, dated May 27, 2008.
International Search Report from International Application No. PCT/US2007/088659, dated Jun. 26, 2008.
International Search Report from PCT/US2007/088563, dated May 20, 2008.
U.S. Appl. No. 11/749,366, Carlson.
U.S. Appl. No. 11/767,033, Carlson, et al.
U.S. Appl. No. 11/960,162, Carlson, et al.
U.S. Appl. No. 11/963,736, Carlson, et al.
U.S. Appl. No. 11/963,095, Carlson, et al.
U.S. Appl. No. 11/963,173, Carlson, et al.
Emmerson, Kassidy; "The History of PayPal: One of the Most Successful Online Money Transmitters Today"; 2009, http://www.associatedcontent.com/pop_print.shtrml?content_type=arti . . . , 1 page.
Kageyama, Yuri; "Japanese carrier unveils mobile-phone wallet"; http://usatoday:printthis.clickability.com/pt/cpt?action=apt &title=USATODAY.com+-+Jap . . . , 3 pages.
Korousic, Bojan et al.; "3rd Year Project Report EX-Ca$h: Feasibility Project"; 2003, Electronics Engineering Technology-Telecommunications Systems, Conestoga College, 33 pages.
Subramanian, Hemang C,; SIM Access Profile: Electronic currency using SIM Access Profile; 2003, http:/www-128.ibm.com/developerworks/wireless/library/wi-simacc/, 6 pages.
"Ubiquitous Commerce"; http://www.accenture.com/Global/Services/Accenture_Technology_Labs/R_and_l/Mobile . . . , 1 page.
"M Pay: Frequently Asked Questions"; http://www.m-pay.com/index.php?id=18, 3 pages.
"GSMVend Technical Manual"; http://www.bonusdata.net/IntusJunior/GSMVend/gsmvend.htm, 14 pages.
Examiner's First Report for Austrialian Patent Application No. 2007339930. 2 pages.
Japanese Office Action mailed Dec. 18, 2012 in JP Application No. 2009-544238 filed Dec. 13, 2012.
EP Search Opinion dated Jun. 13, 2012 for PCT/US2007/088704, Application No. 07869831.3. 7 pages.
Chinese Office Action mailed Apr. 27, 2013 in Chinese Application No. 200780050672.1.
International Search Report and Written Opinion mailed Jun. 11, 2008 for Int'l Application No. PCT/US2007/088704 filed Dec. 21, 2007, 9 pages.
First Office Action mailed Mar. 10, 2011 for CN Application No. 200780050672.1 filed Dec. 21, 2007, 13 pages.
Second Office Action mailed Feb. 2, 2012 for CN Application No. 200780050672.1 filed Dec. 21, 2007, 15 pages.
Third Office Action mailed Sep. 17, 2012 for CN Application No. 200780050672.1 filed Dec. 21, 2007, 16 pages.
Fifth Office Action mailed Jul. 26, 2013 in Chinese Patent Application No. 200780050672.1, 10 pages.

* cited by examiner

REAL-TIME BALANCE UPDATES

CROSS-REFERENCES TO RELATED APPLICATIONS

This is a non-provisional patent application of and claims the benefit of the filing date of U.S. Provisional Patent Application No. 60/871,898 filed on Dec. 26, 2006. This application is herein incorporated by reference in its entirety for all purposes.

BACKGROUND

Some prior systems send consumers notices regarding current transactions. For example, an issuer may notify a consumer when their credit card is being used to make a large purchase. These prior systems often rely on contact information in the account information to notify the consumer. If, for example, only the consumer's home address is on file, the notice may not get to the consumer until well after the transaction has been completed.

Consumers with prepaid cards may want to know the balance left on their prepaid cards before a transaction or as soon as a transaction is completed. For example, a consumer may want to know whether they can afford to purchase a product with the prepaid card before they check out or even before they go to the store. Typically, a consumer contacts the issuer of their prepaid card such as a bank to determine their current balance on the prepaid card. In some cases, however, a prepaid card e.g. gift card may not be associated with an account with an issuer such as those cards purchased at retail stores. The consumer may not easily be able to get their current balance.

Embodiments of the present disclosure address these and other problems, individually and collectively.

SUMMARY OF THE INVENTION

Embodiments of the invention relate to automatic notifications, methods of providing and requesting automatic notifications, and systems that provide automatic notifications.

Embodiments of the invention address the above-noted problems by providing methods and systems of providing notifications with dynamic data to the consumer. Dynamic data refers to information that reflects all transactions on a portable consumer device made through the time a notification is triggered. An example of dynamic data is a real-time updated account balance. Examples of dynamic data include real-time updated account balance and a real-time updated rewards information associated with an account on a portable consumer device. When triggered, a notification with dynamic data is sent to the notification device e.g. cellular phone. The notification can be triggered on a periodic basis or when the consumer uses their portable consumer device to make a transaction. The notification can also be triggered when the consumer requests the dynamic data. For example, consumer could request dynamic data by placing their portable consumer device next to their notification device so that a transmitter in the portable consumer device sends a request to a receiver in the notification device. The consumer could also request the dynamic data by selecting a programmed key on their notification device. Dynamic data is then delivered to the notification device and provided to the consumer if the consumer is enrolled to receive the notification.

An embodiment of the invention is directed to a method that retrieves when a notification with dynamic data is triggered. The dynamic data is associated with an account associated with a portable consumer device associated with a consumer. The method also automatically sends the notification to the notification device, wherein the notification with dynamic data is provided to the consumer.

Another embodiment of the invention is directed to a method that triggers a notification with dynamic data using a notification device. The dynamic data is associated with an account on a portable consumer device associated with a consumer. The method also receives the notification on the notification device.

Another embodiment of the invention is directed to a system that includes a payment processing network for generating and storing dynamic data and a notification server coupled to the payment processing network. The notification server is configured to retrieve the dynamic data from the payment processing network when a notification with dynamic data is triggered. The dynamic data is associated with an account associated with a portable consumer device associated with a consumer. The notification server is also configured to automatically send the notification with the dynamic data to the notification device, wherein the notification with dynamic data is provided to consumer.

Another embodiment of the invention is directed to a phone having a processor, a receiver coupled to the processor, an output device coupled to the processor, and a computer readable medium coupled to the processor. The computer readable medium includes code for displaying a notification including dynamic data to the output device after a portable consumer device is used by a consumer.

These and other embodiments of the invention are described in further detail below.

DETAILED DESCRIPTION

Embodiments of the invention are directed to a method of providing notifications with dynamic data, a method of requesting notifications with dynamic data, and a dynamic data notification system. More specifically, a notification with dynamic data is triggered when the consumer requests the notification or when the consumer uses the portable consumer device. The consumer can also have notifications automatically sent to the notification device on a periodic basis. Once the notification is triggered, dynamic data is retrieved and delivered to the notification device if the consumer is enrolled to receive the notification.

Certain embodiments of the invention may provide one or more technical advantages to issuers and consumers. One technical advantage to a consumer may be knowing their current balance or rewards available on their card without having to contact the issuer which could save time and could save the consumer money. Another technical advantage to a consumer may be that the consumer can request the current balance left on their card so that they can determine whether they have sufficient funds or credit to make a purchase or complete a transaction. A technical advantage to an issuer may be that automatic notifications are sent to consumers and issuer does not have to provide notifications by other means.

Certain embodiments of the invention may include none, some, or all of the above technical advantages. One or more other technical advantages may be readily apparent to one skilled in the art from the figures, descriptions, and claims included herein.

Figure 1:
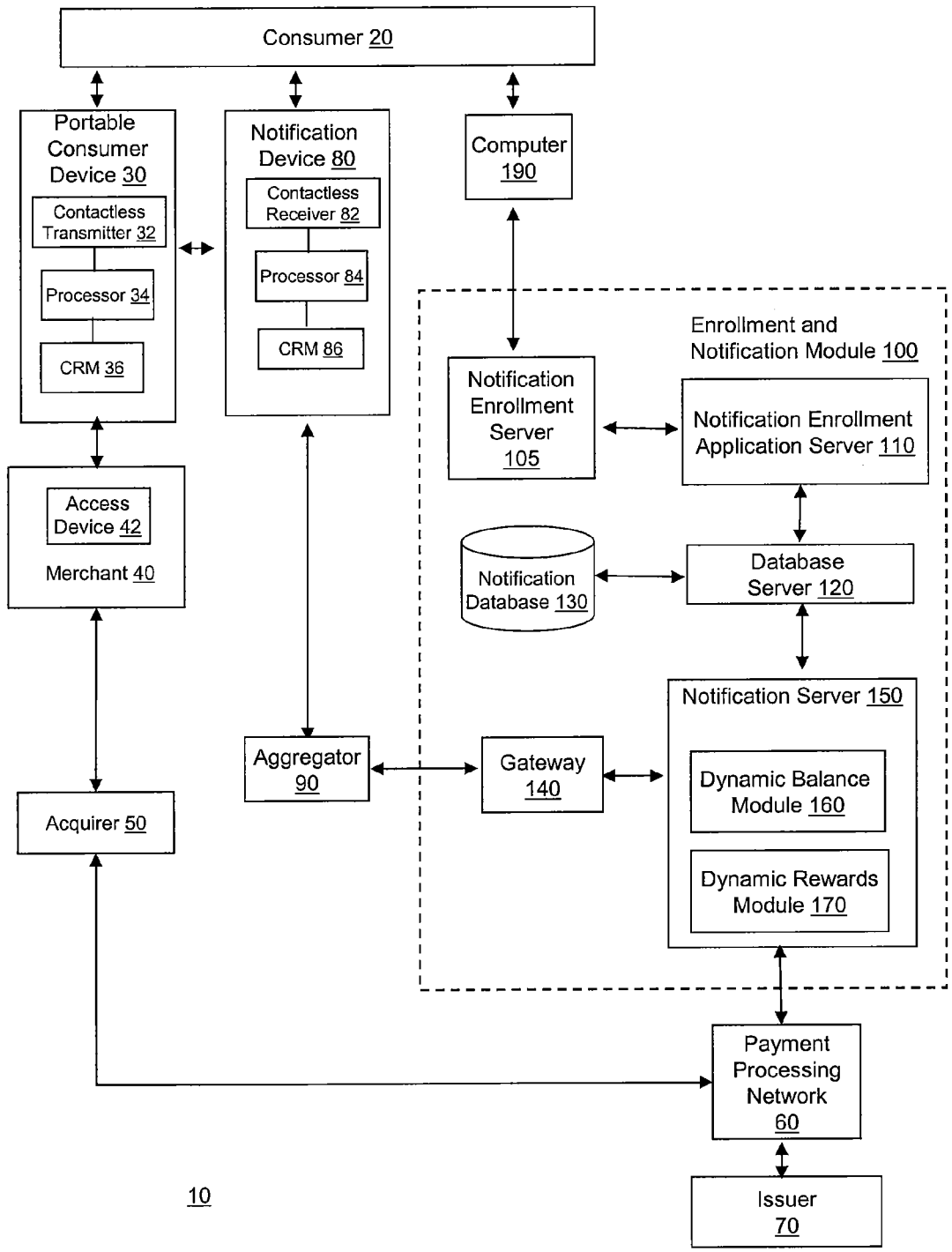
FIG. 1 is a block diagram illustrating a dynamic data notification system, in accordance with an embodiment of the invention.

FIG. 1 is a block diagram illustrating a dynamic data notification system 10, in accordance with an embodiment of the invention. Dynamic data notification system 10 includes a consumer 20, a portable consumer device 30, a merchant 40, an acquirer 50, a payment processing network 60, an issuer 70, a notification device 80, an aggregator 90, an enrollment and notification module 100, and a computer 190. Although one consumer 20, one portable device 30, one merchant 40, one acquirer 50, one issuer 70, one notification device 80, and one computer 190 are shown, there may be any suitable number of any of these entities in dynamic data notification system 10.

Dynamic data notification system 10 includes a consumer 20 in operative communication with portable consumer device 30. Dynamic data notification system 10 also includes a merchant 40 having an access device 42 for interacting with portable consumer device 30 and an acquirer 50 associated with merchant 40. Acquirer 50 is in communication with issuer 70 through payment processing network 60.

Dynamic data notification system 10 also includes a notification device 80 in operative communication with consumer 20 for displaying notifications to consumer 20 and for receiving request or instructions for notifications from consumer 20. Notification device 80 is also in communication with portable consumer device 30 for receiving a request for a notification from consumer 20.

Dynamic data notification system 10 also includes an enrollment and notification module 100 for processing notifications and an aggregator 90 for collecting and forwarding notifications from enrollment and notification module 100 to notification device 80. Dynamic data notification system 10 also includes a computer 190 in communication with enrollment notification module 100 and consumer 20. Consumer can use computer 190 to receive notifications and to enroll in notifications. Dynamic data notification system 10 also includes a payment processing network 60 that is in communication with enrollment and notification module 100, with acquirer 50, and with issuer 70.

Consumer 20 refers to an individual or organization such as a business that is capable of purchasing goods or services or making any suitable transaction with merchant 40.

Portable consumer device 30 refers to any suitable device that allows the transaction to be conducted with merchant 40. Portable consumer device 30 may be in any suitable form. For example, suitable portable consumer devices 30 can be handheld and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices 30 include cellular phones, personal digital assistants (PDAs), pagers, payment cards, security cards, access cards, smart media, transponders, and the like. In some cases, portable consumer device 30 may be associated with an account of consumer 20 such as a bank account.

In the illustrated example, portable consumer device 30 includes a contactless transmitter 32 for sending wireless signals, a processor 34, and a computer readable medium (CRM) 36. These elements of portable consumer device 30 are in communication with each other. Processor 34 (e.g., a microprocessor) processes the functions of portable consumer device 30.

Contactless transmitter 32 refers to any suitable device for sending wireless signals with information stored in memory (e.g. CRM 36) on portable consumer device 30 to notification device 80. Contactless transmitter 32 transmits signals using a near field communications (NFC) capability to send information from portable consumer device 30 to the contactless receiver 82 on notification device 82. Typically, NFC capability is in accordance with a standardized protocol or data transfer mechanism (e.g., ISO 14443/NFC). Some examples of NFC capability are radio-frequency identification (RFID), Bluetooth™, infra-red, and other suitable communications capability. In other embodiments, contactless transmitter 32 transmits information via a cellular network by means of an interface (not shown). The interface functions to permit exchange of data between the cellular network (not shown) and contactless transmitter 32.

CRM 36 may be on the body of portable consumer device 30. The body may in the form of a plastic substrate, a housing, or other structure. CRM 36 may be a memory that stores data and may be in any suitable form. Exemplary CRM 36 may be in any suitable form including a magnetic stripe, a memory chip, etc. If portable consumer device 30 is in the form of a card, it may have an embossed region (ER) which is embossed with a PAN (primary account number). CRM 36 may electronically store the PAN as well as other data such as PIN data.

Merchant 40 refers to any suitable entity or entities that makes a transaction with consumer 20. Merchant 40 may use any suitable method to make the transaction. For example, merchant 40 may use an e-commerce business to allow the transaction to be conducted by merchant 40 through the Internet. Other examples of merchant 40 include a department store, a gas station, a drug store, a grocery store, or other suitable business.

Access device 42 may be any suitable device for communicating with merchant 40 and for interacting with portable consumer device 30. Access device 42 can be in any suitable location such as at the same location as merchant 40. Access device 42 may be in any suitable form. Some examples of access devices 42 include POS devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, websites, and the like. Access device 42 may use any suitable contact or contactless mode of operation to send or receive data from portable consumer devices 30.

If access device 42 is a POS terminal, any suitable POS terminal may be used and may include a reader, a processor, and a computer readable medium. Reader may include any suitable contact or contactless mode of operation. For example, exemplary card readers can include radio frequency (RF) antennas, optical scanners, bar code reader, magnetic stripe readers, etc. to interact with portable consumer device 30.

Acquirer 50 refers to any suitable entity that has an account with merchant 40. In some embodiments, issuer 70 may also be acquirer 50.

Issuer 70 refers to any suitable entity that may open and maintain an account associated with portable consumer device 30 for consumer 20. Some examples of issuers may be a bank, a business entity such as a retail store, or a governmental entity. In many cases, issuer 70 may also issue portable consumer device 30 associated with the account to consumer 20.

Payment processing network 60 refers to a network of suitable entities that have information related an account associated with portable consumer device 30. This information includes data associated with the account on portable consumer device 30 such as profile information, dynamic data, and other suitable information. Dynamic data refers to any suitable information that is updated to reflect the transactions made using portable consumer device 30.

Although not shown in the illustrated embodiment, payment processing network 60 may have or operate a server computer and may include a database. The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. Server computer may use any of a variety of computing structures, arrangements, and compilations for servicing the requests from one or more client computers. In one embodiment, the server computer may be a powerful computer or cluster of computers. For example, the server computer can be a large mainframe, a minicomputer cluster, or a group of servers functioning as a unit. In one example, the server computer may be a database server coupled to a Web server. Server computer services the requests of one or more client computers.

Payment processing network 60 may include data processing subsystems, networks, and operations used to support and deliver authorization services, exception file services, and clearing and settlement services. An exemplary payment processing network 60 may include VisaNet™. Networks that include VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Payment processing network 60 may use any suitable wired or wireless network, including the Internet.

Notification device 80 refers to any suitable device for receiving notifications and for providing the notifications to consumer 20. Notifications refer to communications of dynamic data to consumer 20 on notification device 80. Notifications may be in any suitable form and may be delivered by any suitable method. Some examples of notifications includes a phone call, a voice message, a voicemail message, a short message service (SMS) message e.g. a text message, an instant messaging (IM) message, or an email message, or a periodically updated display on a device. An exemplary embodiment of a notification is a real-time balance update. The real-time balance update is a communication to notify consumer 20 of the funds available (balance) on portable consumer device 30 after the last transaction is accounted for. Another embodiment of a notification is real-time rewards information update that is a communication to notify consumer 20 of rewards available for redemption after the last transaction.

Dynamic data refers to any suitable information that reflects all transactions on a portable consumer device 30 made through the time a notification of the dynamic data is triggered. Dynamic data relates to an account associated with a portable consumer device 30 associated with consumer 20. For example, dynamic data can be account balances such as credit card account balances, stored value account balances, rewards balances, checking account balances, savings account balances, investment account balances, brokerage account balances, and other suitable account balances.

Figure 3:
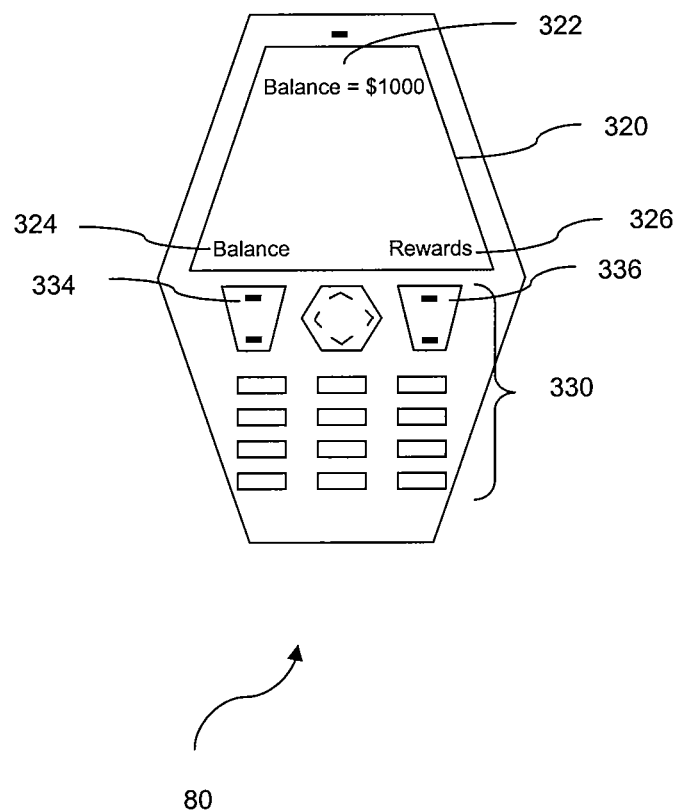
FIG. 3 is a schematic drawing of a cellular phone displaying a real-time balance update, in accordance with an embodiment of the invention.

Notification device 80 may be in any suitable form. For example, suitable notification devices 80 can be hand-held and compact so that they can fit into a consumer's wallet and/or pocket (e.g., pocket-sized). Some examples of notification device 80 include desktop or laptop computers, cellular phones (e.g., as shown in FIG. 3), personal digital assistants (PDAs), pagers, payment cards, security cards, access cards, smart media, transponders, and the like. In some embodiments, notification device 80 and portable consumer device 30 are embodied in the same device.

Notification device 80 includes a contactless receiver 82 for receiving wireless signals, a processor 84 coupled to the receiver 82, and a computer readable medium (CRM) 36 coupled to processor 84. Although not shown, notification device 80 may also include one or more input devices (e.g., keypads) or output devices (e.g., displays, speakers) coupled to processor 84. Contactless receiver 82 refers to any suitable device for receiving wireless signals. The signals are received by contactless receiver 82 by any suitable method (e.g., using NFC capability). In one example, contactless receiver 82 receives a wireless signal with a request for a notification from contactless transmitter 32 of portable consumer device 30. In another example, contactless receiver 82 receives a wireless signal with a notification(s) from aggregator 90 via a cellular network. Processor 84 (e.g., a microprocessor) processes the functions of notification device 80. CRM 86 comprises code for processing requests for notifications, for receiving notifications, and for providing notifications to consumer 20. An example of code for providing notifications to consumer 20 includes code for displaying notifications including dynamic data to an output device.

Consumer 20 uses computer 190 to receive notifications and/or enroll in a program to receive notifications. Computer 190 can be a desktop computer, a laptop computer, a cellular or mobile phone, a personal digital assistant (PDA), or other suitable device.

Enrollment and notification module 100 comprises a notification enrollment server 105, a notification enrollment application server 110, a database server 120, a notification database 130, a notification server 150 having a dynamic balance module 160 and a dynamic rewards module 170, and a gateway 140. Notification enrollment server 105 in communication with a notification enrollment application server 110 which is in communication with database server 120 for storing and retrieving information to and from notification database 130. Database server 120 is also in communication with notification server 150. Notification server 150 is also in communication with gateway 140, dynamic balance module 160, and dynamic rewards module 170. Although enrollment and notification module 100 is shown as being separate from issuer 70, enrollment and notification module 100 can be at issuer 70 in some embodiments. In these embodiments, issuer 70 processes the notifications sent to notification device 80.

Notification enrollment server 105 refers to a device that receives enrollment information from consumer 20 via computer 190 and sends the enrollment information to notification enrollment application server 110. Notification enrollment application server 110 receives the enrollment information from consumer 20 through notification enrollment server 105 or from issuer 70 and may store the enrollment information in notification database 130. Notification database 130 may receive and store new or updated enrollment information and other account information.

Enrollment information includes trigger information that describes the occurrences that must take place to trigger notifications and the types of dynamic data that consumer 20 wants to receive in the notifications. Consumer 20 may define the trigger information when enrolling in a program to receive notifications.

In some cases, notifications are triggered by actions taken by consumer 20 or another suitable entity. For example, a notification may be triggered by using of portable consumer device 30 at access device 42 by consumer 20 or by merchant 40. In another example, a notification may be triggered by the sending of a request by consumer 20 for a notification using portable consumer device 30, notification device 80, computer 190, or other suitable device. In yet another example, a notification may be triggered by placing portable consumer device 30 near notification device 80 so that a signal with a request for a notification is transmitted from contactless transmitter 32 on portable consumer device 30 to contactless receiver 82 on notification device 80. In another example, a notification may be triggered by the completion of a transaction on an account associated with portable consumer device 30. In other cases, periodic notifications may be triggered by the termination a time period defined by consumer 20. Examples of a time period include a week, a day, and an hour. For example, if consumer 20 selects the time period of a day, daily notifications will be sent to notification device 80. Typically, daily notifications would be sent at approximately the same time every day.

Notification server 150 includes dynamic balance module 160 for processing notifications with dynamic balances and dynamic rewards module 170 for processing notifications with dynamic rewards information.

Notification server 150 processes notifications with dynamic data and sends the notifications through gateway 140 to aggregator 90. If the dynamic data is a dynamic balance, dynamic balance module 160 processes the notification. If the dynamic data is dynamic rewards, dynamic rewards module 170 processes the notification. Gateway 140 is a any suitable device that converts information from the protocol or format used in enrollment and notification module 100 to those used in aggregator 90. Aggregator 90 refers to any suitable entity or device that receives notifications, collects the notifications, and transmits the notifications to notification device 80 for consumer 20. In some cases, aggregator 90 may be a wireless telephone company.

Notification server 150 is triggered to send a notification with dynamic data and processes the notification. Notification server 150 retrieves enrollment information with trigger information from notification database 130 using database server 120. Notification server 150 confirms that consumer 20 is enrolled to receive the notification triggered based on the trigger information. Notification server 150 retrieves the dynamic data from issuer 70 or other suitable entity and sends the notification with the dynamic data through gateway 140 to aggregator 90. Aggregator 90 collects notifications according to enrollment information and forwards the notifications to notification device 80. If the notification triggered is associated with dynamic balance data, dynamic balance module 160 processes the notification. If the notification triggered is associated with dynamic rewards data, dynamic rewards module 170 processes the notification.

In one example embodiment, consumer 20 enrolls in a program using computer 190 to receive notifications on their notification device 80 (e.g. a cellular phone) in the form of text or voice messages. Consumer 20 enrolls to receive notifications with the dynamic balance on the account associated with their portable consumer device 30 (e.g. a prepaid or gift card). Consumer 20 specifies that the notification will be sent every time portable consumer device 30 interacts with access device 42.

In a typical payment transaction, consumer 20 uses portable consumer device 30 at access device 42 to purchase goods or services from merchant 40. For example, a consumer may use a gift card with $50 to buy a $25 game cartridge at a toy store using a POS (point of sale) terminal at the toy store. The consumer may swipe the gift card through a slot in the POS terminal and the POS terminal may read data including an account number from the gift card.

An authorization request message is then forwarded to acquirer 50 and acquirer 50 forwards the message through payment processing network 60 to issuer 70. Using portable consumer device 30 at access device 42 triggers notification server 150 to send a notification.

Issuer 70 determines whether or not to authorize the transaction. The transaction may be authorized if there are sufficient funds, and may be declined if there are insufficient funds. An authorization response message is then sent back through payment processing network 60 to acquirer 50 who forwards it to merchant 40. At the end of the day, a normal clearing and settlement process can be conducted by payment processing network 60. A clearing process is a process of exchanging financial details between and acquirer and an issuer to facilitate posting to a consumer's account and reconciliation of the consumer's settlement position.

In this example, the notification triggered is associated with a dynamic balance and dynamic balance module 160 processes the notification. Dynamic balance module 160 is triggered to send a notification when consumer used portable consumer device 30. For example, dynamic balance module 160 may receive information that the previously described and registered gift card has been used to purchase a $25 game cartridge.

Dynamic balance module 160 retrieves enrollment information with trigger information from notification database 130 using database server 120. Dynamic balance module 160 uses the trigger information to confirm that consumer 20 wants to receive the notification that has been triggered. Dynamic balance module 160 also determines from the trigger information that consumer 20 wants to receive the triggered notification in the form of a text message. Dynamic balance module 160 retrieves the dynamic balance on the account associated with portable consumer device 30. For example, the module 160 may determine that there is the balance on the gift card is $25. The dynamic balance will reflect the last transaction authorized including the transaction associated with the action of using portable consumer device 30 that triggered the notification. Dynamic balance module 160 sends a text message with the dynamic balance to notification device 80. For example, the text message may indicate that the gift card now has a balance of $25 after buying the $25 game cartridge. Notification device 80 provides the text message to consumer 10. For example, the consumer's phone may display the balance of $25 plus the account number associated with the gift card. Consumer 20 may thereafter store this information in the notification device 80 for future use in determining how much money is left on the portable consumer device 30.

Modifications, additions, or omissions may be made to dynamic data notification system 10 without departing from the scope of the disclosure. The components of dynamic data notification system 10 may be integrated or separated according to particular needs. Moreover, the operations of dynamic data notification system 10 may be performed by more, fewer, or other system modules. Additionally, operations of dynamic data notification system 10 may be performed using any suitable logic comprising software, hardware, other logic, or any suitable combination of the preceding.

Figure 2:
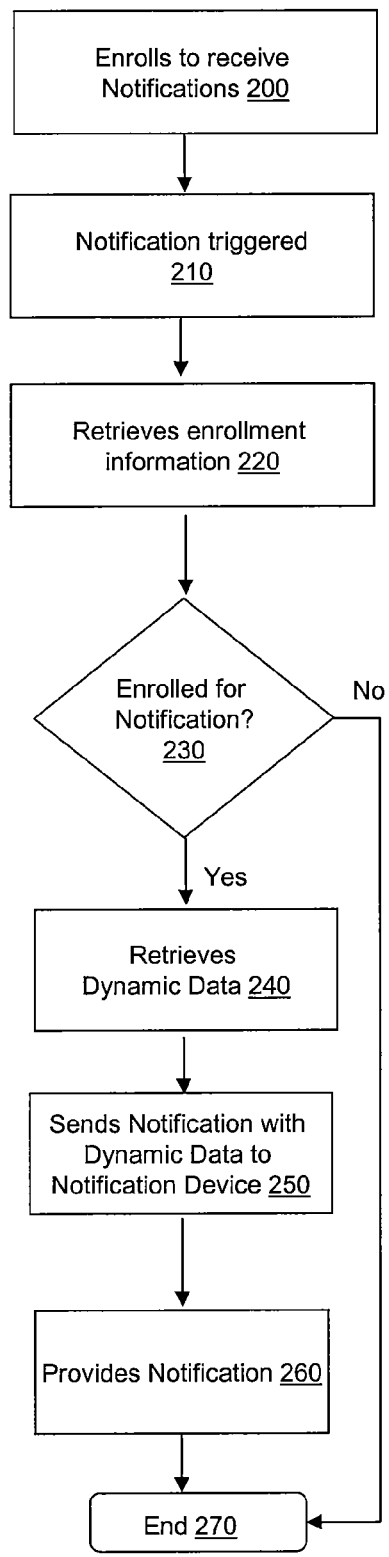
FIG. 2 is a flow chart illustrating a method of providing dynamic data notifications, in accordance with an embodiment of the invention.

FIG. 2 is a flow chart illustrating a method of providing dynamic data notifications, in accordance with an embodiment of the invention.

Consumer 20 enrolls in a program using computer 190 to receive notifications on their portable consumer device 30 (step 200). Computer 190 sends enrollment information from consumer 20 to notification enrollment server 105. Notification enrollment server 105 sends the enrollment information to notification enrollment application server 110. Notification enrollment application server 110 sends the enrollment information to database server 120 to store it in notification database 130.

A notification is triggered (step 210). Notification server 150 detects that the notification has been triggered. Consumer 20 or other suitable entity triggers the notification.

In one embodiment, consumer 20 or other suitable entity triggers a notification by using portable consumer device 30 at access device 42. In some cases, a notification is only triggered if the transaction is authorized and completed. When portable consumer device 30 is used, information indicating that a notification has been triggered is sent from access device 42 to acquirer 50 which forwards it to notification server 150 through payment processing network 60.

In another embodiment, consumer 20 triggers a notification by requesting it on notification device 80 or computer 190 which forwards the request for a notification to notification server 150. For example, consumer 20 may request a notification by selecting a programmed button on their cellular phone. The cellular phone sends the request to notification server 150.

In another embodiment, consumer 20 triggers a notification by placing portable consumer device 30 next to notification device 80. A signal with a request for a notification is emitted from contactless transmitter 32 in portable consumer device 30 and received by contactless receiver 82 on notification device 80. Notification device 80 forwards the request to notification server 150.

In yet another embodiment, a notification is triggered automatically on a periodic basis by notification server 150. Typically, the notification is triggered at the end of the time period although any time during that time period can be used. Consumer 20 selects the time period such as daily, hourly, or weekly. For example, consumer 20 can select daily notifications sent at 12:00 a.m.

In one example embodiment, consumer 20 enrolls in a program using computer 190 to receive notifications on their notification device 80 e.g. cellular phone in the form of email messages. Consumer 20 enrolls to receive notifications with the dynamic balance on the account on their portable consumer device 30 e.g. a prepaid card. Consumer 20 specifies that the notification will be sent every time portable consumer device 30 interacts with access device 42.

Notification server 150 retrieves enrollment information (step 220) retrieved from notification database 130 using database server 120. The enrollment information is associated with an account on portable consumer device 30. In embodiments where consumer 20 requested the notification, notification server 150 may skip retrieving the enrollment information and checking enrollment for the notification (steps 220 and 230) and go to retrieving dynamic data (step 240).

Notification server 150 analyzes trigger information in the enrollment information to determine whether consumer 20 is enrolled to receive the notification that has been triggered (step 230). If consumer 20 is not enrolled for the notification, the method ends (step 270) and a notification is not sent to consumer 20.

If consumer 20 is enrolled to receive the notification, notification server 150 retrieves the dynamic data (step 240). Notification server 150 generates a notification with the dynamic data and sends it to aggregator 90 through gateway 140. Aggregator 90 forwards the notification to notification device 160 for delivery to consumer 20 (step 250). Notification device 80 provides the notification to consumer 20 (step 260).

In one embodiment, the notification may be shown to consumer 20 on a screen on notification device 80. The display of the notification may be a text message displayed on a screen or other suitable display until consumer 20 turns off the display. In other cases, the notification may be displayed for a predetermined period of time.

In another embodiment, the notification may be sent to consumer in the form of a voice message or voicemail message to consumer 20. For example, the notification may be an automated voice announcement that is sent to the notification device 20.

After providing the notification, the method ends (step 270). Modifications, additions, or omissions may be made to the method without departing from the scope of the disclosure. The method may include more, fewer, or other steps. Additionally, steps may be performed in any suitable order without departing from the scope of the disclosure.

FIG. 3 is a schematic drawing of a cellular phone displaying a real-time balance update, in accordance with an embodiment of the invention. Notification device 80 includes a display 320 for displaying information such as notifications with dynamic data, buttons 330 for inputting information such as requests for notifications, a speaker (not shown) to send aural signals to consumer 20, and a microphone (not shown) to receive aural signals from consumer 20.

Display 320 includes a dynamic data display 322 for displaying the notification of the updated dynamic data consumer 20. In the illustrated example, dynamic data display 322 is showing the real-time balance update on the account associated with portable consumer device 30. Dynamic data can be updated at any suitable time. Some examples of when the dynamic data is updated include when consumer requests the dynamic data, when consumer 20 uses portable consumer device 30, or periodically.

Buttons 330 include a balance request button 334 for requesting a real-time balance update and a rewards request button 336 for requesting a real-time rewards information update. Display 320 also includes a balance request button indicator 324 indicating that selecting balance request button 334 will request a real-time balance update. Display 320 also includes a rewards request button indicator 326 indicating that selecting rewards request button 336 will request a real-time rewards information update.

In operation, consumer 20 selects balance request button 334 to display real-time balance update on dynamic data display 322. The request is forwarded to notification server 150. Notification server 150 retrieves the real-time balance from issuer 70 or other suitable entity over payment processing network 60. Notification server 150 sends the real-time balance update to notification device 80 and notification device 80 displays the update to consumer 20.

Modifications, additions, or omissions may be made to notification device 80 without departing from the scope of the disclosure. For example, notification device 80 and portable consumer device 30 may be integrated into the same device. Also, the components of notification device 80 may be integrated or separated according to particular needs. Moreover, the operations of notification device 80 may be performed by more, fewer, or other modules. Additionally, operations of notification device 80 may be performed using any suitable logic comprising software, hardware, other logic, or any suitable combination of the preceding.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

What is claimed is:

1. A method comprising:
   triggering a notification using a notification device of a consumer, wherein the notification is triggered by placing the notification device near a portable consumer device; and
   receiving the notification on the notification device,
   wherein the notification device belongs to the consumer and comprises a contactless receiver, a processor, a computer-readable medium, and a display,
   wherein the portable consumer device belongs to the consumer and is associated with an account identifier and comprises a payment device and a contactless transmitter,
   wherein the notification comprises dynamic data associated with the account, and
   wherein by placing the portable consumer device near the notification device, a signal is sent from the contactless transmitter on the portable consumer device to the contactless receiver on the notification device.

2. The method of claim 1, wherein the dynamic data is a real-time balance update.

3. The method of claim 1, wherein the dynamic data is a real-time rewards information update.

4. The method of claim 1, wherein the notification with the dynamic data is provided to consumer on the display of the notification device.

5. The method of claim 4, wherein the notification with the dynamic data is provided in response to a request for the notification by the consumer on the notification device.

6. A method of claim 1,
   wherein the notification device is a phone, and
   wherein the notification sent to the notification device includes at least one of a phone call, voicemail, short message service (SMS), instant message (IM), or email.

7. A method of claim 1, wherein the dynamic data is based on a transaction conducted using the portable consumer device at an access device located at a merchant.

8. The method of claim 1, wherein the notification device sends a request for the notification to a notification server in operative communication with a payment processing network.

9. A method of claim 1, wherein the notification device and the portable consumer device are separate devices.

10. A system comprising:
    a payment processing network for generating and storing dynamic data; and
    a notification server, comprising a processor and a computer-readable medium, coupled to the payment processing network, the notification server configured to:
       when a notification with dynamic data is triggered, retrieve the dynamic data from the payment processing network, wherein the dynamic data is associated with an account associated with a portable consumer device belonging to a consumer, wherein the portable consumer device comprises a payment device and a contactless transmitter; and
       send the notification with the dynamic data to a notification device belonging to the consumer, wherein the notification with dynamic data is provided to the consumer and wherein the notification device includes a contactless receiver,
    wherein the notification with dynamic data is triggered by placing the notification device near the portable consumer device such a contactless signal is sent from the contactless transmitter on the portable consumer device to the contactless receiver on the notification device.

11. The system of claim 10, wherein the notification server is further configured to:
    retrieve enrollment information; and
    confirm that consumer is enrolled to receive the notification based on the enrollment information.

12. The system of claim 10,
    wherein the dynamic data is based on an amount of a transaction being conducted.

13. The system of claim 10, wherein the dynamic data is based on an amount of rewards available for redemption after a transaction.

14. A system of claim 13, wherein the transaction is a most recent transaction.

15. A method comprising:
    when a notification with dynamic data is triggered, retrieving the dynamic data associated with an account associated with a portable consumer device belonging to a consumer; and
    sending the notification with the dynamic data to a notification device belonging to the consumer, wherein the notification with the dynamic data is provided to the consumer, wherein the notification device belongs to the consumer and comprises a contactless receiver, a processor, a computer-readable medium, and a display, wherein the portable consumer device comprises a payment device and a contactless transmitter, wherein the notification comprises dynamic data associated with the account, and wherein the notification is triggered by placing the notification device near the portable consumer device such a contactless signal is sent from the contactless transmitter on the portable consumer device to the contactless receiver on the notification device.

16. A method of claim 15, wherein the dynamic data is a real-time balance update.

17. A method of claim 15, wherein the dynamic data is a real-time rewards information update.

18. A method of claim 15, further comprising:
retrieving enrollment information; and
confirming that consumer is enrolled to receive the notification based on the enrollment information.

19. A method of claim 15, wherein the notification is triggered by a request for the notification with dynamic data sent from the notification device.

20. A method of claim 15, wherein the notification with the dynamic data is provided to consumer on a display of the notification device.

21. A method of claim 15,
wherein the notification device is a phone, and
wherein the notification sent to the notification device includes at least one of a phone call, voicemail, short message service (SMS), instant message (IM), or email.

22. A method of claim 15, wherein the dynamic data is based on an amount of a transaction and the transaction occurs at an access device located at a merchant.

23. A non-transitory computer-readable medium, executable by a processor, for performing a method comprising the steps of:

when a notification with dynamic data is triggered, retrieving the dynamic data associated with an account associated with a portable consumer device belonging to a consumer;

sending the notification with the dynamic data to a notification device belonging to the consumer, wherein the notification with the dynamic data is provided to the consumer; and wherein the notification device belongs to the consumer and comprises a contactless receiver, a processor, a computer-readable medium, and a display, wherein the portable consumer device comprises a payment device and a contactless transmitter, wherein the notification comprises dynamic data associated with the account, and wherein the notification is triggered by placing the notification device near the portable consumer device such a contactless signal is sent from the contactless transmitter on the portable consumer device to the contactless receiver on the notification device.

* * * * *